UNITED STATES PATENT OFFICE 2,737,510
Patented Mar. 6, 1956

2,737,510

POLYAZO DYESTUFFS

Hans Ischer, Ernst Iselin, and Walter Wehrli, Basel, Switzerland, assignors to Sandoz A. G., Basel, Switzerland, a Swiss firm No Drawing. Application March 27, 1953,
Serial No. 345,262

Claims priority, application Switzerland
November 27, 1952

5 Claims. (Cl. 260—145)

The present invention relates to polyazo dyestuffs.

In accordance with this invention, a group of valuable polyazo dyestuffs is obtained by coupling one mol of the diazo compound from an aminodisazo dyestuff of the formula

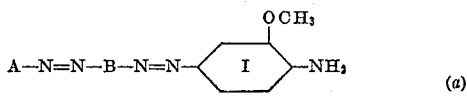

(a)

wherein each of A and B represents a radical of the benzene or naphthalene series, the two —N=N— groups are in para-position with respect to each other, and nucleus I may be further substituted by methyl, methoxy or acylamino, with one mol of the copper complex compound of a monoazo dyestuff of the formula

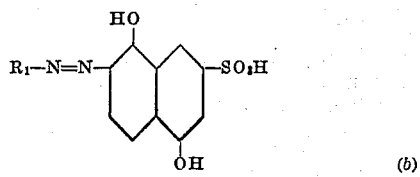

(b)

wherein $R_1$ stands for the radical of a hydroxynaphthalene monosulfonic, disulfonic or trisulfonic acid, or of a pyrazolone or pyrazolone sulfonic acid, or of 1-hydroxy-4-methylbenzene, the radical $R_1$ being coupled in orthoposition to the hydroxy group, the reactants being so selected that the resultant polyazo dyestuff contains at least two sulfonic acid groups. The said polyazo dyestuff may then be treated in substance or on the fiber with a copper yielding agent.

The aminodisazo dyestuffs corresponding to formula (a) may for instance be prepared by diazotizing a starting component A, for example 1-aminobenzene-2,5-disulfonic acid, coupling the resultant diazo compound in weakly acid medium with a middle component B, for example 1-amino-3-methylbenzene, further diazotizing the thus-obtained monoazo dyestuff, and coupling the diazotized product with a component capable of metal complex formation, for example 4-methyl-1-methoxy-2-aminobenzene, in weakly acid medium.

However, the aminodisazo dyestuffs corresponding to the aforesaid formula (a) may also be produced by coupling for example, the diazo compound of 1-amino-4-nitrobenzene-2-sulfonic acid in alkaline medium with a 1-hydroxybenzene-2-carboxylic acid, reducing the nitro group of the resultant monoazo dyestuff by means of sodium sulfide, then further diazotizing and coupling the thus-diazotized product with a middle component capable of metal complex formation, such for example as 1-methoxy-2-amino-4-acetylaminobenzene, in weakly acid medium.

Illustrative of starting or initial components A for the preparation of the said aminodisazo dyestuffs are inter alia: aminobenzene, 1-amino-2-methylbenzene, 1-amino-3-methylbenzene, 1-amino-4-methylbenzene, 1-amino-2,3-dimethylbenzene, 1-amino-2,4-dimethylbenzene, 1-amino-2,5-dimethylbenzene, 1-amino-2,6-dimethylbenzene, 1-aminobenzene-2-sulfonic acid, 1-aminobenzene-3-sulfonic acid, 1-aminobenzene-4-sulfonic acid, 1-aminobenzene-2,4-disulfonic acid, 1-aminobenzene-2,5-disulfonic acid, 1-amino-2-methylbenzene-4-sulfonic acid, 1-amino-2-methylbenzene-5-sulfonic acid, 1-amino-4,6-dimethylbenzene-2-sulfonic acid, 1-aminobenzene-2-carboxylic acid, 1-aminobenzene-3-carboxylic acid, 1-aminobenzene-4-carboxylic acid, 1-amino-4-hydroxybenzene-3-carboxylic acid, 1-amino-3-hydroxybenzene-4-carboxylic acid, 1-amino-3-methyl-4-hydroxybenzene-5-carboxylic acid, 1-amino-4-hydroxy-5-carboxybenzene-3-sulfonic acid, 1-amino-4-acetylaminobenzene-2-sulfonic acid, as well as other aminobenzenes substituted by —SO₃H, —COOH, halogen, —OH, alkoxy and/or alkyl groups; also 1-aminonaphthalene, 2-aminonaphthalene, 2-aminonaphthalene-3-carboxylic acid, 1-aminonaphthalene-4-sulfonic acid, 1-aminonaphthalene-5-sulfonic acid, 1-aminonaphthalene-8-sulfonic acid, 1-aminonaphthalene-3,6-disulfonic acid, 1-aminonaphthalene-4,8-disulfonic acid, 1-aminonaphthalene-3,8-disulfonic acid, 2-aminonaphthalene-1-sulfonic acid, 2-aminonaphthalene-6-sulfonic acid, 2-aminonaphthalene-8-sulfonic acid, 2-aminonaphthalene-4,8-disulfonic acid, 2-aminonaphthalene-5,7-disulfonic acid, 2-aminonaphthalene-6,8-disulfonic acid, 2-aminonaphthalene-3,6-disulfonic acid, 1-aminonaphthalene-3,6,8-trisulfonic acid, as well as other aminonaphthalene sulfonic acids.

Illustrative of middle components B are inter alia: aminobenzene, 1-amino-3-methylbenzene, 1-amino-2,5-dimethylbenzene, 1-amino-2-methoxybenzene, 1-amino-3-methoxybenzene, 1-amino-2-methyl-5-methoxybenzene, 1-amino-2,5-dimethoxybenzene, 1-amino-2,5-diethoxybenzene, 1-amino-3-acetylaminobenzene, 1-amino-2-methoxy-5-acetylaminobenzene, 1-aminonaphthalene, 1-aminonaphthalene-6-sulfonic acid, 1-aminonaphthalene-7-sulfonic acid, 1-amino-2-methoxynaphthalene, 1-amino-2-ethoxynaphthalene, 1-amino-2-methylnaphthalene, 1-amino-2-methoxynaphthalene-6-sulfonic acid, 1-amino-2-ethoxynaphthalene-6-sulfonic acid, etc. Instead of a monoazo dyestuff from an initial component A and a middle component B, it is also possible to use for example 4-amino-1,1'-azobenzene, 4-amino-1,1'-azobenzene-4'-sulformylaminobenzene, 1-amino-2-methoxy-5-benzoylaminobenzene, 1-amino-2-methoxy-5-cinnamoylaminobene, etc.

Illustrative of amines of nucleus I are inter alia: 1-amino-2-methoxybenzene, 1-amino-2-methoxy-5-methylbenzene, 1-amino-2,5-dimethoxybenzene, 1-amino-2-methoxy-5-acetylaminobenzene, 1-amino-2-methoxy-5-formylaminobenzene, 1-amino-2-methoxy-5-benzoylaminobenzene, 1-amino-2-methoxy-5-cinnamoylaminobenzene, etc.

In the monoazo dyestuffs of formula (b), the symbol $R_1$ preferably stands e. g. for a radical of 1-hydroxynaphthalene-3-sulfonic acid, 1-hydroxynaphthalene-4-sulfonic acid, 1-hydroxynaphthalene-5-sulfonic acid, 2-hydroxynaphthalene-4-sulfonic acid, 2-hydroxynaphthalene-6-sulfonic acid, 2-hydroxynaphthalene-7-sulfonic acid, 1-hydroxynaphthalene-3,6-disulfonic acid, 1-hydroxynaphthalene-3,8-disulfonic acid, 1-hydroxynaphthalene-4,8-disulfonic acid, 2-hydroxynaphthalene-3,6-disulfonic acid, 2-hydroxynaphthalene-6,8-disulfonic acid, 1-hydroxynaphthalene-3,5,7-trisulfonic acid, 1-hydroxynaphthalene-3,6,8-trisulfonic acid, 1-phenyl-3-methyl-5-pyrazolone, 1-phenyl-3-methyl-5-pyrazolone-2'-sulfonic acid, 1-phenyl-3-methyl-5-pyrazolone-3'-sulfonic acid, 1-phenyl-3-methyl-5-pyrazolone-4'-sulfonic acid, 1-(6'-chloro)-phenyl-3-methyl-5-pyrazolone-3'-sulfonic acid, 1-(2'-methyl)-phenyl-3-methyl-5-pyrazolone-4'-sulfonic acid, 1- phenyl-3-methyl-5-pyrazolone - 3' - carboxylic acid, 1-phenyl-5-pyrazolone-3-carboxylic acid and 1-hydroxy-4-methylbenzene.

The coupling of the aminodisazo dyestuffs (a) is carried out with the copper complex compounds of the monoazo dyestuffs (b) to yield the new polyazo dyestuffs, and this is advantageously effected in the presence of an organic base, such as pyridine, quinoline, etc. at temperatures of 0 to 60° C.

The new polyazo dyestuffs are advantageously treated—for being converted into the copper complex compounds in substance—with copper-yielding agents in such manner that the methoxy groups are split. This may be effected according to various methods known from the literature, for example by heating with copper salts in weakly acid to alkaline medium in the presence or absence of ammonia, organic bases, and optionally with the use of superatmospheric pressure, or in a fusion of alkali salts of low molecular weight aliphatic carboxylic acids.

The new polyazo dyestuffs contain at least two sulfonic acid groups and correspond to the formula

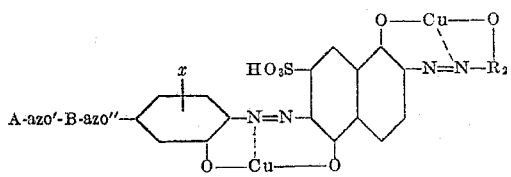

wherein A stands for a diazo component radical of the benzene or naphthalene series, B stands for a middle component radical of the benzene or naphthalene series,

stands for the radical of a hydroxynaphthalene-mono-, -di- or -tri-sulfonic acid, or of a 5-pyrazolone or 5-pyrazolone sulfonic acid or of 1-hydroxy-4-methylbenzene, and x stands for H, $CH_3$, $OCH_3$ or NH.acyl, and wherein -azo'- is in para-position to -azo"-, and dye cotton and fibers or regenerated cellulose in gray to olive-green shades of good fastness to light and to washing. After treatment of the dyeings with copper-yielding agents further improves the fastness properties thereof.

The following examples set forth representative exemplary embodiments of the invention, and these examples are intended to be solely illustrative and not at all limitative. In these examples, the parts and percentages are by weight and the temperatures are expressed in degrees centigrade.

*Example 1*

56.7 parts of the aminodisazo compound—obtained by coupling diazotized 2-aminonaphthalene-6,8-disulfonic acid with 1-amino-3-methylbenzene, further diazotizing and coupling with 1-amino-2-methoxy-5-methylbenzene—are stirred into 500 parts of water, 7 parts of sodium nitrite added to the suspension, and the latter adjusted so that it is acid to Congo by the addition of 50 parts of concentrated hydrochloric acid and while stirring thoroughly at 10-12°. The diazotization is complete in about two to three hours. The obtained diazo suspension is combined at room temperature (about 20-25°) with a solution of 55.2 parts of the copper complex compound of the formula

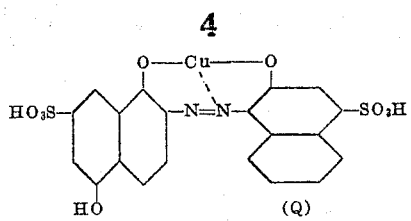

in 600 parts of water and 1500 parts of pyridine. The mass is heated to 50-60° for two hours to complete the coupling.

In order to copper the thus-prepared tetrakisazo dyestuff, there is added to the latter at 90° a solution of 25 parts of crystalline copper sulfate, 25 parts of aqueous ammonia (25%) and 100 parts of water, and the mixture is stirred at 90-95° until the copper complex compound—with splitting of the methoxy group—has formed. The dyestuff is thereupon isolated (by salting out and filtering off) and dried at 90°. It corresponds to the formula

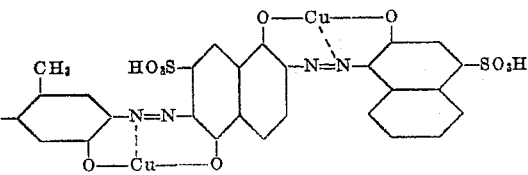

and dyes cotton and fibers of regenerated cellulose in olive shades of outstanding fastness to light and very good fastness to washing.

Dyestuffs with similar excellent properties are obtained when, while otherwise proceeding as aforedescribed in the present example, the initial component of the aminodisazo compound — 2-aminonaphthalene-6,8-disulfonic acid—is replaced by 2-aminonaphthalene-3,6-disulfonic acid,
2-aminonaphthalene-4,8-disulfonic acid,
2-aminonaphthalene-5,7-disulfonic acid,
1-aminonaphthalene-3,6-disulfonic acid,
1-aminonaphthalene-3,8-disulfonic acid,
1-aminonaphthalene-4,8-disulfonic acid,
1-aminonaphthalene-4-sulfonic acid,
1-aminonaphthalene-5-sulfonic acid,
1-aminonaphthalene-6-sulfonic acid,
1-aminonaphthalene-7-sulfonic acid,
1-aminonaphthalene-8-sulfonic acid,
2-aminonaphthalene-1-sulfonic acid,
2-aminonaphthalene-5-sulfonic acid,
2-aminonaphthalene-6-sulfonic acid,
2-aminonaphthalene-8-sulfonic acid,
1-aminobenzene-2,4-disulfonic acid,
1-aminobenzene-2,5-disulfonic acid,
1-aminobenzene-2-sulfonic acid,
1-aminobenzene-3-sulfonic acid,
1-aminobenzene-4-sulfonic acid,
1-amino-2-methylbenzene-4-sulfonic acid,
1-amino-2-methylbenzene-5-sulfonic acid,
1-amino-2,4-dimethylbenzene-6-sulfonic acid,
1-amino-3-carboxy-4-hydroxybenzene-5-sulfonic acid,
Dehydrothio-p-toluidine-monosulfonic acid, or
Dehydrothio-p-toluidine-disulfonic acid, or when, while starting from any of the foregoing initial components, the middle component—1-amino-3-methylbenzene—of the aminodisazo compound is replaced by aminobenzene, or 1-amino-2-methoxybenzene,
1-amino-2,5-dimethylbenzene,
1-amino-2,5-dimethoxybenzene,
1-amino-2,5-diethoxybenzene,
1-amino-3-acetylaminobenzene,
1-amino-2-methoxy-5-acetylaminobenzene,
1-aminonaphthalene,
1-amino-2-methoxynaphthalene, or
1-amino-2-ethoxynaphthalene, or when, in any one of the aforementioned combinations, the end component—1-amino-2-methoxy-5-methylbenzene—of the aminodisazo compound is replaced by 1-amino-2-methoxybenzene,
1-amino-2-methoxy-5-acetylaminobenzene,
1-amino-2-methoxy-5-propionylaminobenzene
1-amino-2-methoxy-5-formylaminobenzene,
1-amino-2-methoxy-5-benzoylaminobenzene,
1-amino-2-methoxy-5-carbethoxyaminobenzene, or
1-amino-2,5-dimethoxybenzene, or when, finally, in any one of the foregoing combinations, the copper complex compound (c) is replaced by a copper complex compound wherein the radical (Q) is replaced by the radical of 1-hydroxynaphthalene-3-sulfonic acid,
1-hydroxynaphthalene-4-sulfonic acid,
1-hydroxynaphthalene-5-sulfonic acid,
2-hydroxynaphthalene-6-sulfonic acid, or
2-hydroxynaphthalene-7-sulfonic acid.

Example 2

87.7 parts of the aminodisazo compound—obtained by coupling diazotized 1-aminonaphthalene-7-sulfonic acid with 1-aminonaphthalene-7-sulfonic acid, further diazotizing and coupling with 1-amino-2-methoxy-5-methylbenzene—are diazotized after the manner described in Example 1. The obtained diazo compound is combined

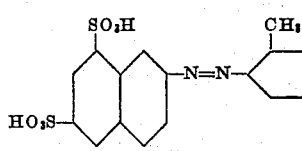

with a solution of 55.2 parts of the copper complex compound (c), 600 parts of water and 1500 parts of pyridine. After conversion of the resultant tetrakisazo dyestuff into the copper complex compound, there is obtained a dyestuff which corresponds to the formula

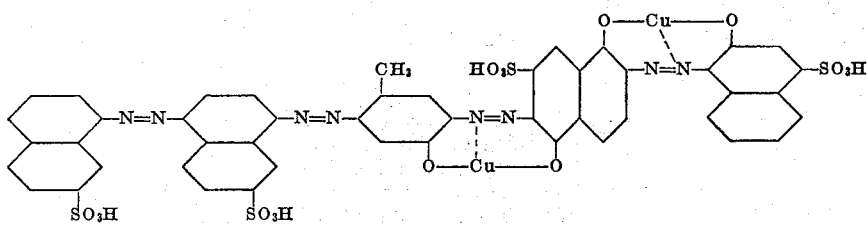

and dyes cotton and fibers of regenerated cellulose in gray shades of outstanding fastness to light and good fastness to washing.

Dyestuffs with similar properties are obtained when, while otherwise proceeding as aforedescribed in the present example, the starting component 1-aminonaphthalene-7-sulfonic acid in the aminodisazo compound is replaced by one of the initial components enumerated in Example 1 or by 1-aminonaphthalene,
2-aminonaphthalene,
Aminobenzene,
1-amino-3-methylbenzene,
1-amino-4-methylbenzene,
1-amino-2,5-dimethylbenzene,
1-amino-4-hydroxybenzene-3-carboxylic acid,
1-amino-4-hydroxy-5-methylbenzene-3-carboxylic acid,
1-aminobenzene-4-carboxylic acid,
1-amino-2-carboxybenzene-4-sulfonic acid,
1-amino-2-carboxybenzene-5-sulfonic acid, or
1-aminobenzene-2,5-dicarboxylic acid, or when, starting from any of the foregoing initial components, the middle component 1-aminonaphthalene-7-sulfonic acid of the aminodisazo compound is replaced by 1-amino-naphthalene-6-sulfonic acid, or when, in any of the foregoing combinations, the 1-amino-2-methoxy-5-methylbenzene end component in the aminodisazo compound is replaced by any one of the end components enumerated in Example 1, or when, in any of the foregoing combinations, the radical (Q) of the copper complex compound (c) is replaced by one of the radicals enumerated in Example 1.

Example 3

56.7 parts of the aminodisazo compound used in Example 1 are coupled in the manner described in the said example, with 58.1 parts of the copper complex compound of the formula

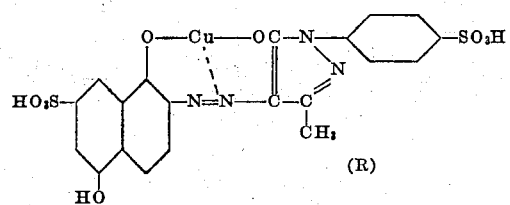

and then subjected to demethylating coppering. The thus-obtained polyazo dyestuff corresponds to the formula

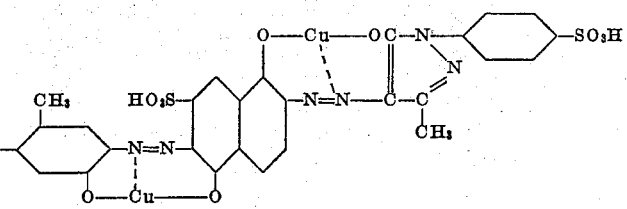

and dyes cotton and fibers of regenerated cellulose in olive shades of outstanding fastness to light and very good fastness to washing.

Dyestuffs with similar properties are obtained when, in the preceding paragraph, the initial, middle and/or end component of the aminodisazo compound is replaced by one of the corresponding components enumerated in Example 1, or when, in any of the resultant combinations, the radical (R) of the copper complex compound (d) is replaced by the radical of 1-phenyl-3-methyl-5-pyrazolone-2'-sulfonic acid,
1-phenyl-3-methyl-5-pyrazolone-3'-sulfonic acid,
1-(6'-chloro)-phenyl-3-methyl - 5 - pyrazolone-3'-sulfonic acid,
1-(2'-methyl)-phenyl-3-methyl - 5 - pyrazolone-4'-sulfonic acid,
1-phenyl-3-methyl-5-pyrazolone-3'-carboxylic acid, or
1-phenyl-5-pyrazolone-3-carboxylic acid.

Example 4

52.9 parts of the aminodisazo compound—obtained by coupling diazotized 1 - amino - 4 - hydroxybenzene-3-carboxylic acid with 1-aminonaphthalene-7-sulfonic acid, further diazotizing, and coupling with 1-amino-2-methoxy-5-methylbenzene—are diazotized after the manner set forth in Example 1, coupled with 63.2 parts of the copper complex compound of the formula

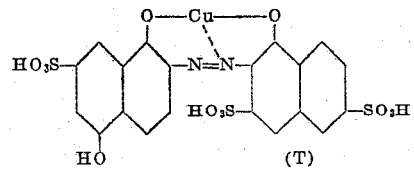

and then subjected to demethylating coppering. The thus-obtained polyazo dyestuff corresponds to the formula

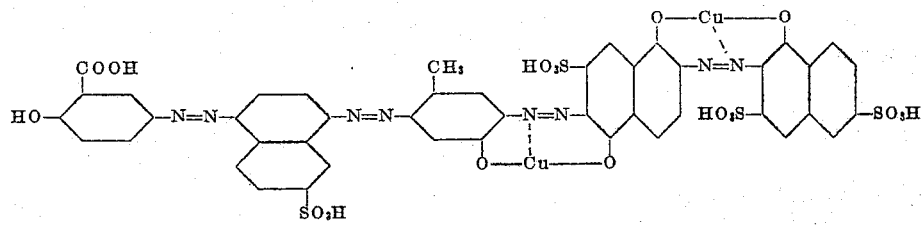

and dyes cotton and fibers of regenerated cellulose in gray shades of outstanding fastness to light and very good fastness to washing. By aftertreating the dyeings with copper-yielding agents, the fastness to wet treatment can be further enhanced.

Dyestuffs with similar fastness properties are obtained when, while otherwise proceeding as set forth in the present example, the initial component of the amino-disazo compound is replaced by 1-amino-3-carboxy-4-hydroxybenzene-5-sulfonic acid,
1-amino-4-hydroxy-5-methylbenzene-3-carboxylic acid,
1-aminobenzene-2-sulfonic acid,
1-aminobenzene-3-sulfonic acid,
1-aminobenzene-4-sulfonic acid,
1-amino-2,5-dimethylbenzene-3-sulfonic acid,
1-aminonaphthalene-4-sulfonic acid,
1-aminonaphthalene-5-sulfonic acid,
1-aminonaphthalene-6-sulfonic acid,
1-aminonaphthalene-7-sulfonic acid,
1-aminonaphthalene-8-sulfonic acid,
1-aminonaphthalene,
2-aminonaphthalene,
Aminobenzene,
1-amino-4-methylbenzene,
1-amino-2,5-dimethylbenzene,
1-aminobenzene-4-carboxylic acid, or
Dehydrothio-p-toluidine-monosulfonic acid, or when, starting from any one of the foregoing combinations, the middle component of the aminodisazo compound is replaced by 1-aminonaphthalene-6-sulfonic acid, or, if the initial component contains a solubilizing group, by one of the middle components enumerated in Example 1, or when, in any one of the foregoing combinations, the end component of the aminodisazo compound is replaced by one of the end components enumerated in Example 1, or when finally, in any one of the foregoing combinations, the radical (T) of the copper complex compound (e) is replaced by the radical of 1-hydroxynaphthalene-3,8-disulfonic acid,
1-hydroxynaphthalene-4,8-disulfonic acid,
2-hydroxynaphthalene-3,6-disulfonic acid,
2-hydroxynaphthalene-6,8-disulfonic acid, or
1-hydroxynaphthalene-3,6,8-trisulfonic acid.

*Example 5*

1 part of a dyestuff prepared according to any of the foregoing Examples 1 to 4 is dissolved in 3000 parts of water, and 5 parts of Glauber's salt are added to the solution. The thus-prepared dyebath is heated to 50° and, at this temperature, 100 parts of cotton are entered. The dyebath is then heated to 95° in the course of 15–20 minutes and maintained at this temperature for 15 minutes. Thereupon 5 to 15 more parts of Glauber's salt are added and dyeing continued at 95° for about 30 minutes more. After cooling the bath to 50°, the dyed material is withdrawn, rinsed thoroughly and dried. The resultant dyeing has outstanding fastness to light and good fastness to wet treatments.

Having thus disclosed the invention, what is claimed is:

1. A polyazo dyestuff which contains at least two sulfonic acid groups and corresponds to the formula

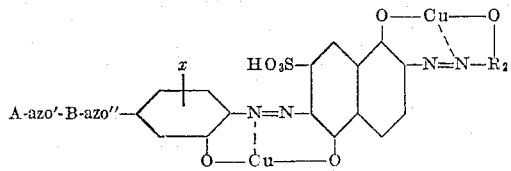

wherein A stands for a member selected from the group consisting of diazo component radicals of the benzene and naphthalene series, B stands for a member selected from the group consisting of middle component radicals of the benzene and naphthalene series, $$-O$$
$$-R_2$$

stands for a member selected from the group consisting of residues of hydroxy-naphthalene-mono-, -di- and -tri-sulfonic acids, of 5-pyrazolones, and of 1-hydroxy-4-methylbenzene, $x$ stands for a member selected from the group consisting of hydrogen, —CH₃, —OCH₃ and —NH.acyl, and wherein -azo'- stands in para-position to -azo"-.

2. The polyazo dyestuff which corresponds to the formula

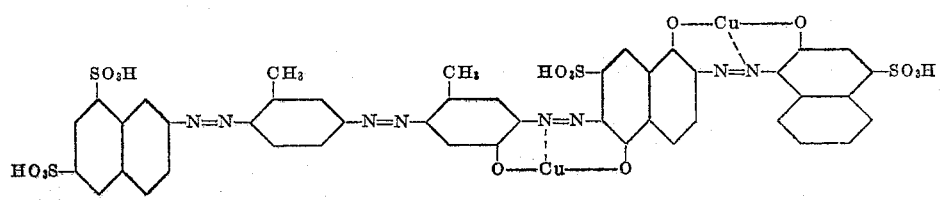

3. The polyazo dyestuff which corresponds to the formula
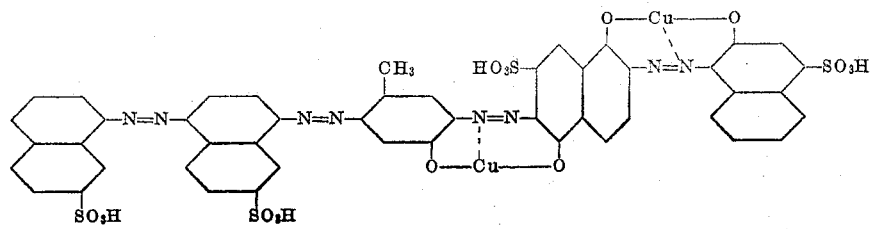
4. The polyazo dyestuff which corresponds to the formula
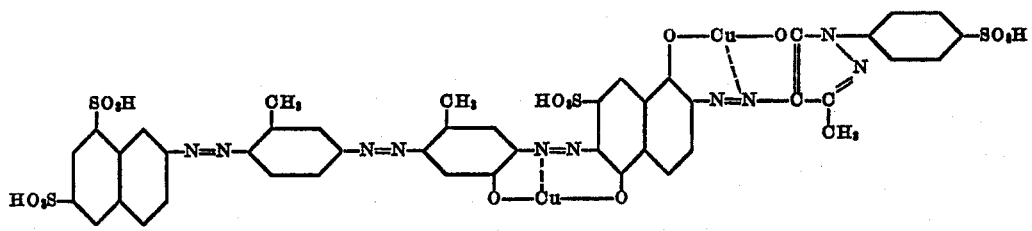
5. The polyazo dyestuff which corresponds to the formula
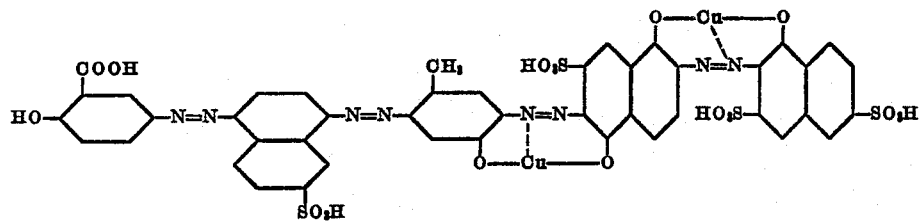
References Cited in the file of this patent
UNITED STATES PATENTS
| | | |
|---|---|---|
| 2,242,456 | Delfs | May 20, 1941 |
| 2,640,824 | Ischer | June 2, 1953 |
| 2,673,200 | Ruckstuhl et al. | Mar. 23, 1954 |